United States Patent [19]
de Valk et al.

[11] Patent Number: 6,048,391
[45] Date of Patent: Apr. 11, 2000

[54] MEANS FOR AND METHODS OF PREPARING A GLUE FOR CORRUGATED BOARD

[75] Inventors: Anton de Valk, Bergeyk; William van der Zanden, Weert, both of Netherlands

[73] Assignee: Serco Holland, Bladel, Netherlands

[21] Appl. No.: 08/934,265

[22] Filed: Sep. 19, 1997

Related U.S. Application Data

[60] Provisional application No. 60/026,829, Sep. 27, 1996.

[51] Int. Cl.⁷ .............................. C09J 5/00; C09J 103/02
[52] U.S. Cl. ...................................... 106/217.2; 106/211.1
[58] Field of Search ............................... 106/211.1, 217.2

[56] References Cited

U.S. PATENT DOCUMENTS

| | | | |
|---|---|---|---|
| 2,102,937 | 12/1937 | Bauer | 106/213 |
| 5,000,788 | 3/1991 | Stotler | 106/213 |

*Primary Examiner*—David Brunsman
*Attorney, Agent, or Firm*—J. Warren Whitesel; Laff, Whitesel & Saret, Ltd.

[57] ABSTRACT

The invention provides a process for the preparation of a starch based glue for making corrugated board. The process is carried out in a system which includes a first and relatively large mixing vessel containing a stirrer. A second and smaller mixing vessel is connected to the first vessel via a recirculation path. The second and smaller mixing vessel contains means for exerting a shearing force which is greater than the shearing force exerted in the first and larger mixing vessel. The process is carried out in two steps. A first step is to make a carrier by combining water, starch and a limited amount of lye in the large vessel. A second step adds further amounts of starch, water, borax, and a second shot of lye to the carrier while in the small vessel. Adding lye in two steps is a principal aspect of the invention. If all lye is added in one step, it must be limited to an amount which does not prematurely gelatinize the starch to a level which defeats the glue making.

6 Claims, 6 Drawing Sheets

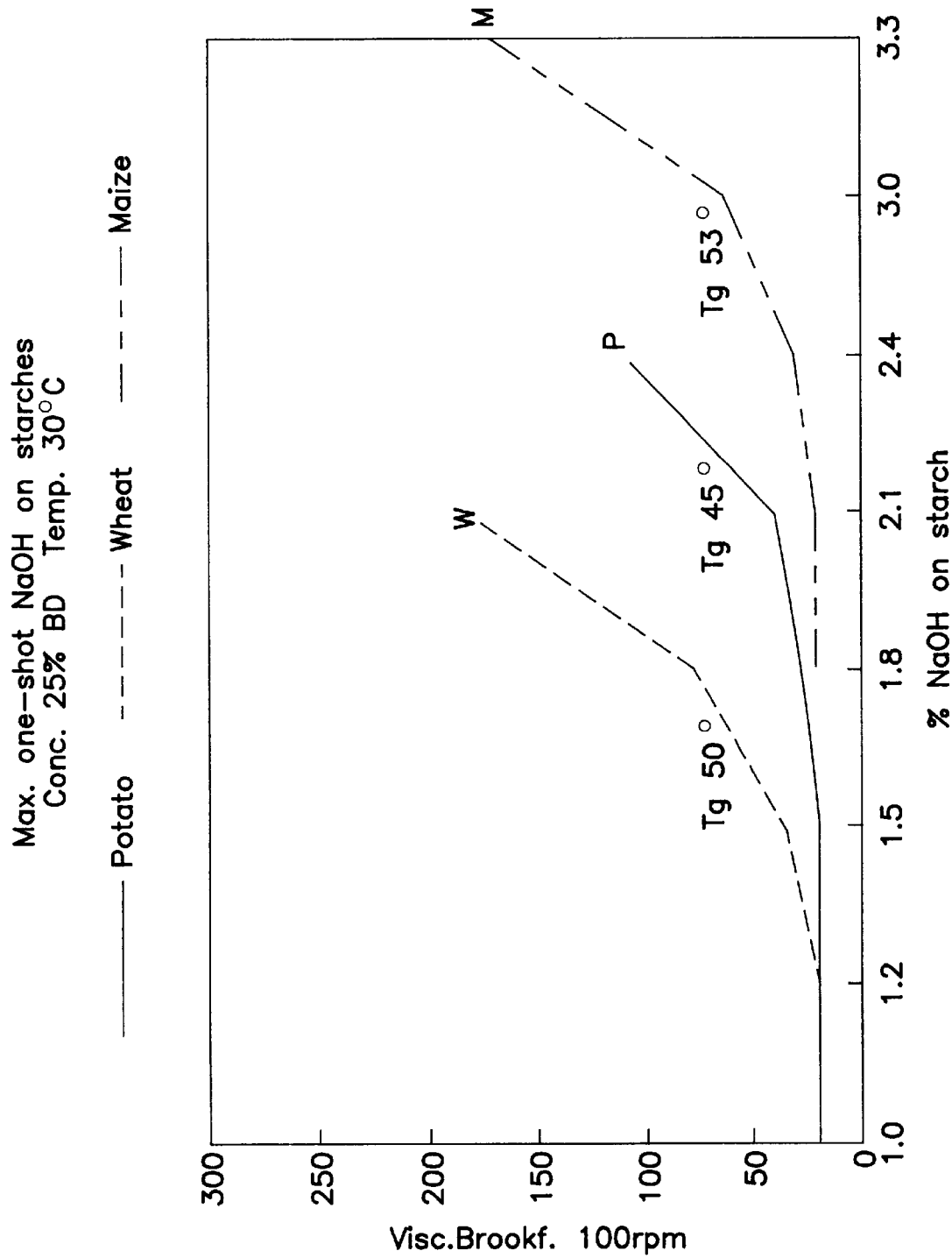

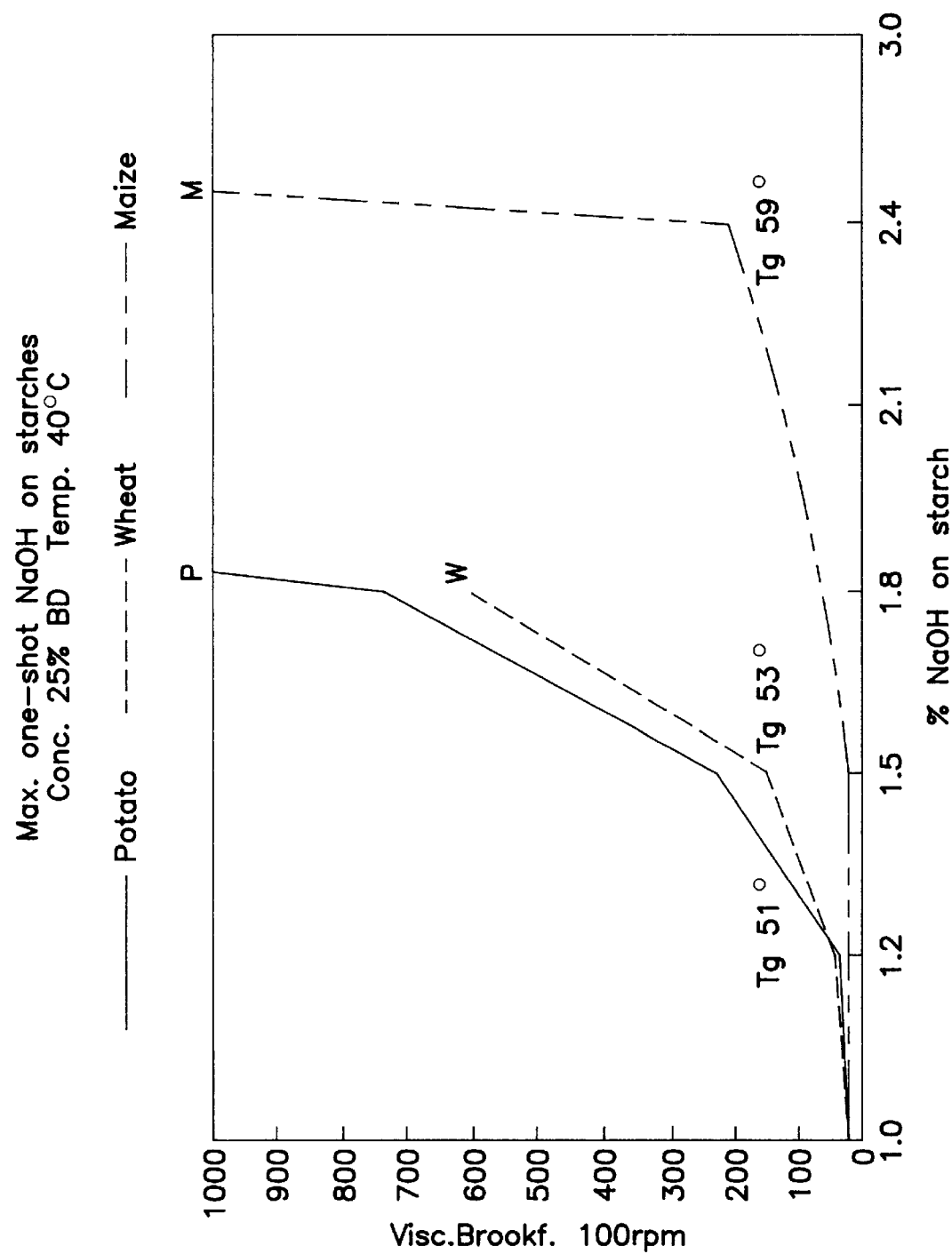

MEANS FOR AND METHODS OF PREPARING A GLUE FOR CORRUGATED BOARD

This is a formal application replacing provisional application Ser. No. 60/026,829, filed Sep. 27, 1996.

This invention relates to means for and methods of preparing a glue or adhesive, on a batch basis, for making corrugated board and especially for introducing more lye during a preparation of a glue used in a corrugation machine.

BACKGROUND OF THE INVENTION

There are special characteristics for glue which is used in a system for making corrugated cardboard. Among other things, these characteristics include a gelatinization of starch in order to obtaining a desired gel point at a faster rate. The starch gelatinizes in response to a certain quantity of NaOH (Lye) which is introduced into a compound that includes at least water and starch. With the development of machines that produce corrugated board at speeds that are much higher than previous speeds, much higher demands are being placed on the glue or adhesive that is used and the speed at which such glue or adhesive is produced.

Currently, most starch-based glues or adhesives and their production are based on the "Stein-Hall" patent (U.S. Pat. No. 2,102,937). These adhesives are based on:

- a gelatinized starch carrier which is used at a viscosity that keeps the secondary starch in suspension and which determines the rheology, the structure, and the viscostability of the glue. These characteristics greatly influence the amount of glue that is applied on the glue rolls and thus on the paper in the corrugator.
- uncooked starch (raw starch) that gelatinized in situ at the corrugator machine results in a rapid gelatinization and formation of a "wet tack, green bond" between the corrugated medium and the liner.
- alkaline reagents, commonly caustic soda, assist in the gelatinization of the carrier starch and a lowering of the gelatinization temperature of the uncooked starch. This speeds up the gelatinization "in situ" of the raw starch.
- "borax", increases the viscosity (wet tack, green bond) when the uncooked starch is gelatinized on the corrugator.

An example of currently used formulations contain 80–77% water, 2–3% gelatinized starch, 25–18% raw starch, 0.1–0.5% caustic soda, and 0.05–0.5% borax.

The gelatinized starch can be unmodified maize (corn), wheat, tapioca or potato starch. Or it is a modified crosslinked starch which enhances the Theological characteristics of the glue that improve its runnability on the machine.

The raw starch can be native or modified crosslinked maize, wheat, potato, or tapioca. The best suited starch has a natural low gelatinization temperature and a high viscosity when gelatinized "in situ" on the corrugator. When this happens, a minimal amount of chemicals (caustic soda and borax) is needed, especially borax, since boron is toxic.

To increase the production speed of the corrugated board machine, a faster adhesive formulation can be prepared. The "Stein-Hall" adhesive can be modified in two ways:

- the amount of caustic soda is increased in order to decrease the gelatinization temperature of the uncooked starch. This results in a faster gelatinization and the formation of a bond between the medium and the liner.
- the amount of uncooked starch is increased in order to decrease the amount of water that has to be evaporated from the board. The board is then dry with less time and energy.

Currently, most "Stein-Hall" adhesives are prepared in a one tank system in the corrugated board factory.

A sequence for making such an adhesive is:

make a slurry of the carrier starch which is 10 to 17% dry solid heat to 30–55° C.

and add caustic soda stir until the viscosity is stable dilute with water add raw starch add borax stir until the viscosity is stable Now formulas are used with a higher amount of caustic soda (lye) and higher amount of raw starch in order to increase the dry solids and to increase the binding speed of the adhesive. The concentration of the caustic soda in the slurry is so high that, when the secondary starch is added into the slurry, the first part of the raw starch partial gelatinizes. This also happens when a gelatinized carrier starch is added to a slurry of raw starch, which this causes an increase in viscosity and deteriorates the viscosity stability of the glue. It also limits the maximum concentration of dry solids in the glue. More important, a premature gelatinization tends to limit the amount of lye that can be added.

A method for the batch preparation of a glue for corrugated board is known from European patent application No. 0 391 477 which provides an excellent result. However, since lye is added at one time, the rapid gelatinization limits the amount of lye that can be introduced into the carrier.

According to Example 1 of this European patent application, the carrier is prepared by adding water, starch, and a NaOH-solution to a first, relatively large, mixing vessel. The contents of the first, relatively large mixing vessel, are circulated from and to the first mixing vessel via a recirculation pipe, in which a second and comparatively smaller mixing vessel is incorporated. The smaller vessel is also provided with means for exerting a shearing force upon the mixture. The shearing forces are much greater in the smaller vessel than in the large mixing vessels. In the second step, water, starch, and powdered borax are supplied to the carrier, which has been prepared in the first mixing vessel, with continuous stirring and recirculating.

Further research has shown that it is possible to improve the properties of the glue which is thus prepared. In particular, is possible to prepare a homogeneous glue. An inhomogeneity may be eliminated by a prolonged circulation of the mixture via the recirculation pipe and the relatively small mixing vessel which is present therein.

SUMMARY OF THE INVENTION

The invention is particularly focused on preventing the swelling of the raw starch in the glue or adhesive by dosing liquid caustic soda (lye) in a controlled manner. Caustic soda is a catalyst for causing a chemical reaction in starch slurries. The raw starch should only swell "in situ" on the corrugator.

Accordingly, an object of the invention is to provide a method of preparing a glue which enables a relatively short mixing time. As a result, the production capacity is increased in comparison with the production capacity of the prior art method using approximately the same amount of equipment. It is also possible to process starches having a high peak viscosity.

According to an aspect of the invention, part of the caustic soda (lye) is added after the addition of raw starch to the preparation. When adding liquid caustic soda into a starch slurry in a continuously or semi-continuously controlled manner within a mixing zone, it is possible to prevent the swelling of the raw starch. Also, liquid caustic soda is slowly added to a slurry to prevent a partially solubilizing of the starch. The purpose of this use of caustic soda is to prevent a loss of efficiency and to have a constant reaction in each starch granule. This makes it possible to have higher dry solids and a viscosity stable adhesive with a lower gel temp.

Heretofore, the industry has not prevented the solubilizing of the starch in order to prevent viscosity increases. The purpose of this invention is to increase the efficiency of the chemical reaction with the starch granule.

In keeping with a further aspect of the invention, a system for preparing a glue that is used to make corrugated cardboard has a first and relatively large mixing vessel containing a stirrer. A second and smaller mixing vessel is connected thereto via a recirculation pipe. The second mixing vessel includes a stirring means for exerting a shearing force which is greater than the shearing force exerted in the first mixing vessel. The preparation is carried out in two steps. A first step is to prepare a carrier starting from water, starch, and lye. Then, a second step adds the remaining amount of starch, water, lye by injecting it into second mixing vessel, and then borax is added to the carrier. The aggregate is mixed into a homogeneous mixture. The amount of starch used in the first step is smaller than the amount of starch used in the second step.

BRIEF DESCRIPTION OF DRAWINGS

The invention will be better understood by studying the following description taken with the attached drawings, in which:

FIGS. 5 and 6 are similar to FIG. 3 and graphical show how the gel point changes with the amount of caustic soda (lye) that is applied in two shots; and

SYSTEM APPARATUS

Figure 1:
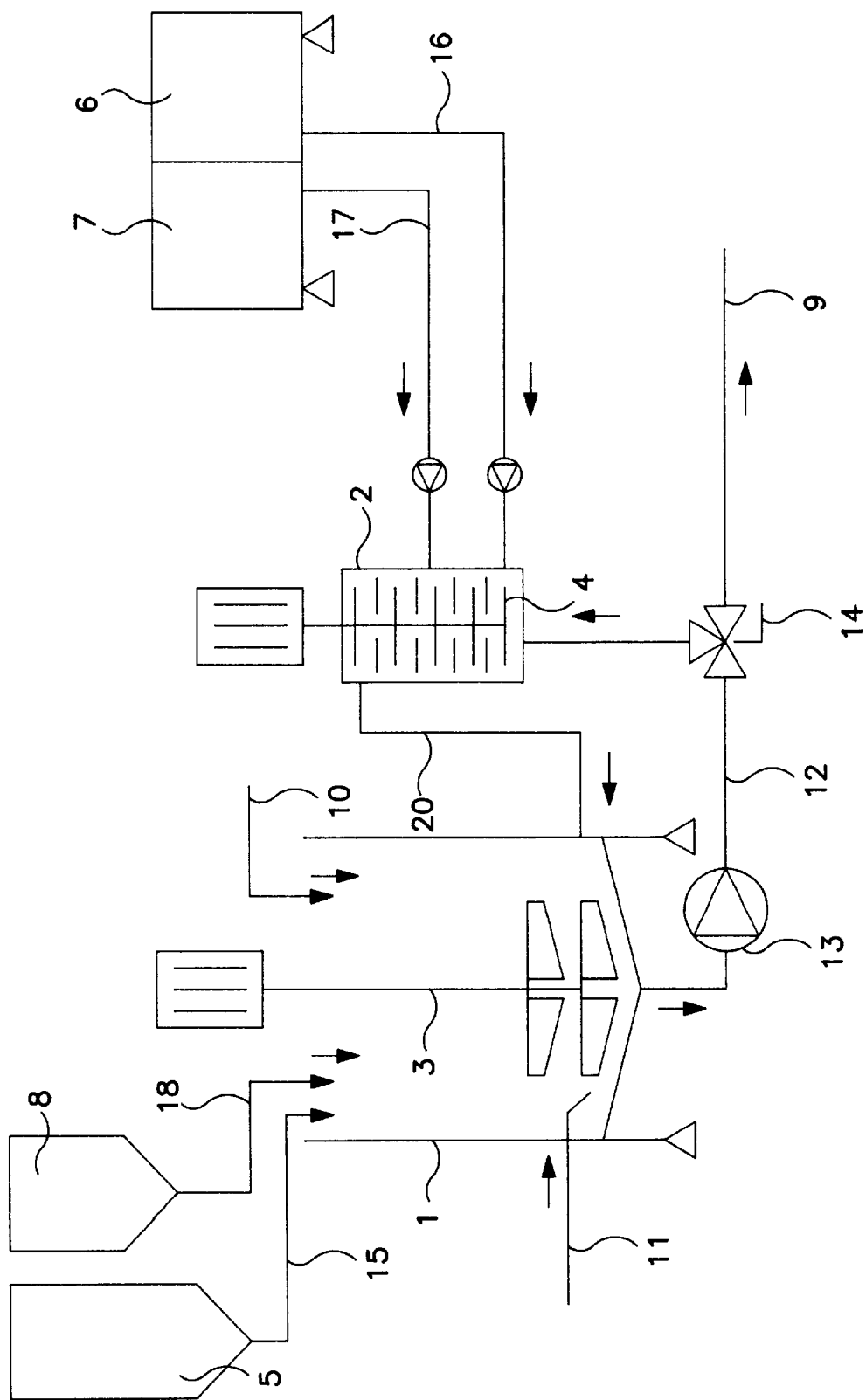
FIG. 1 schematically shows a preferred system for making glue or adhesive for a corrugator.
Figure 2:
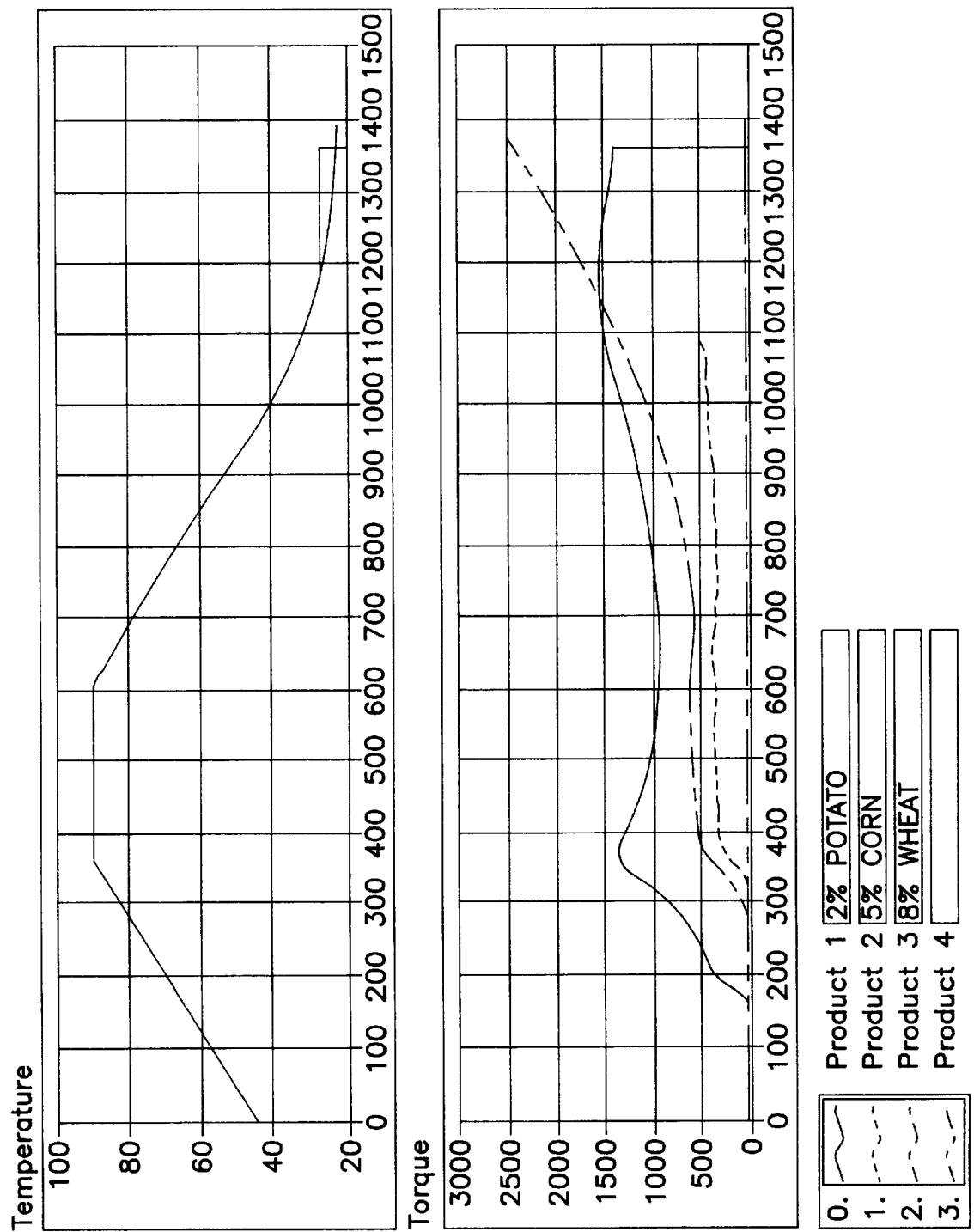
FIG. 2 graphically shows how potato, corn, and wheat starch changes with temperature and time.
Figure 3:
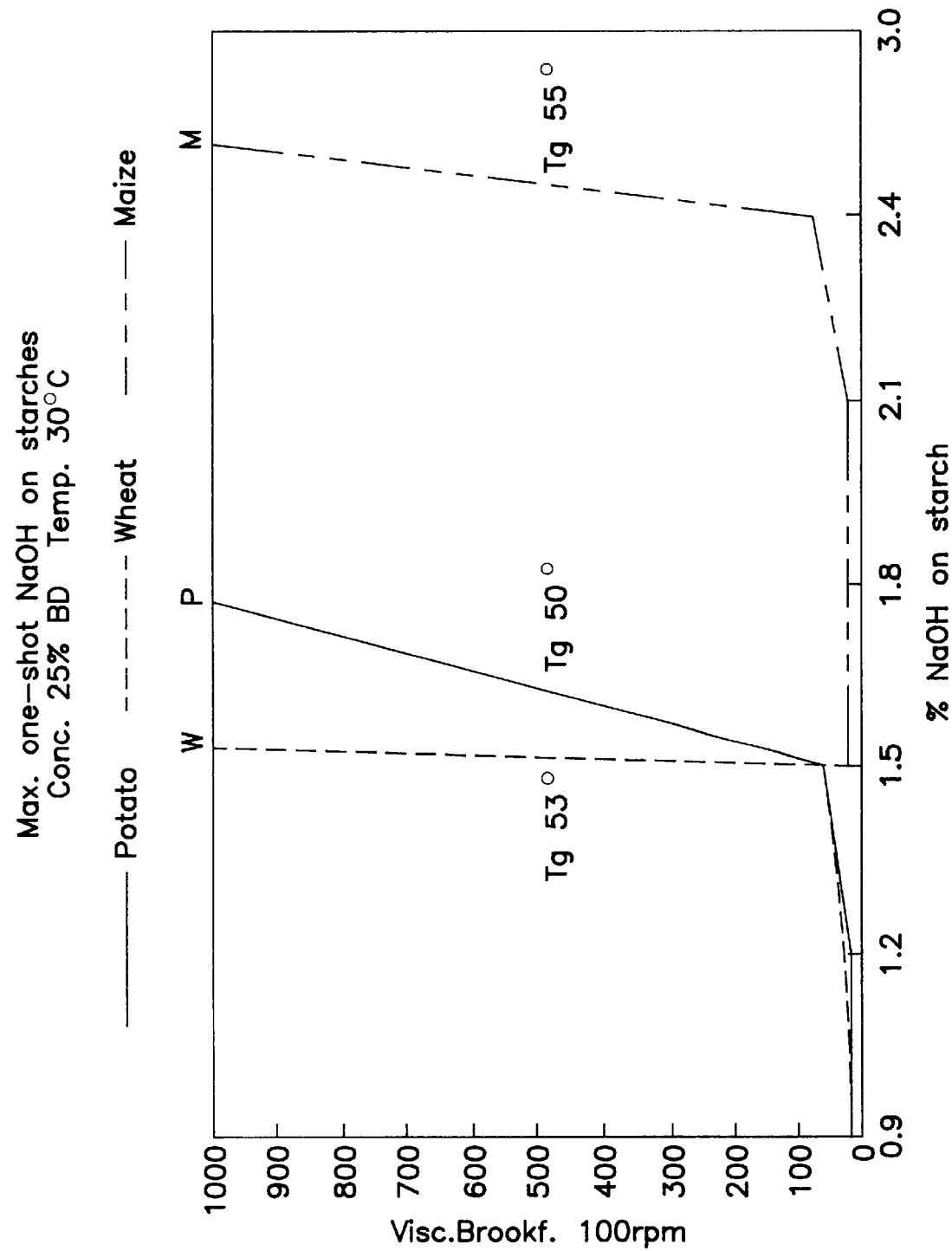
FIGS. 3 and 4 graphically show how the potato, wheat, and corn starch gel point changes with the amount of caustic soda (lye) that is applied in one shot and the percentage of lye to starch that is used.
Figure 4:
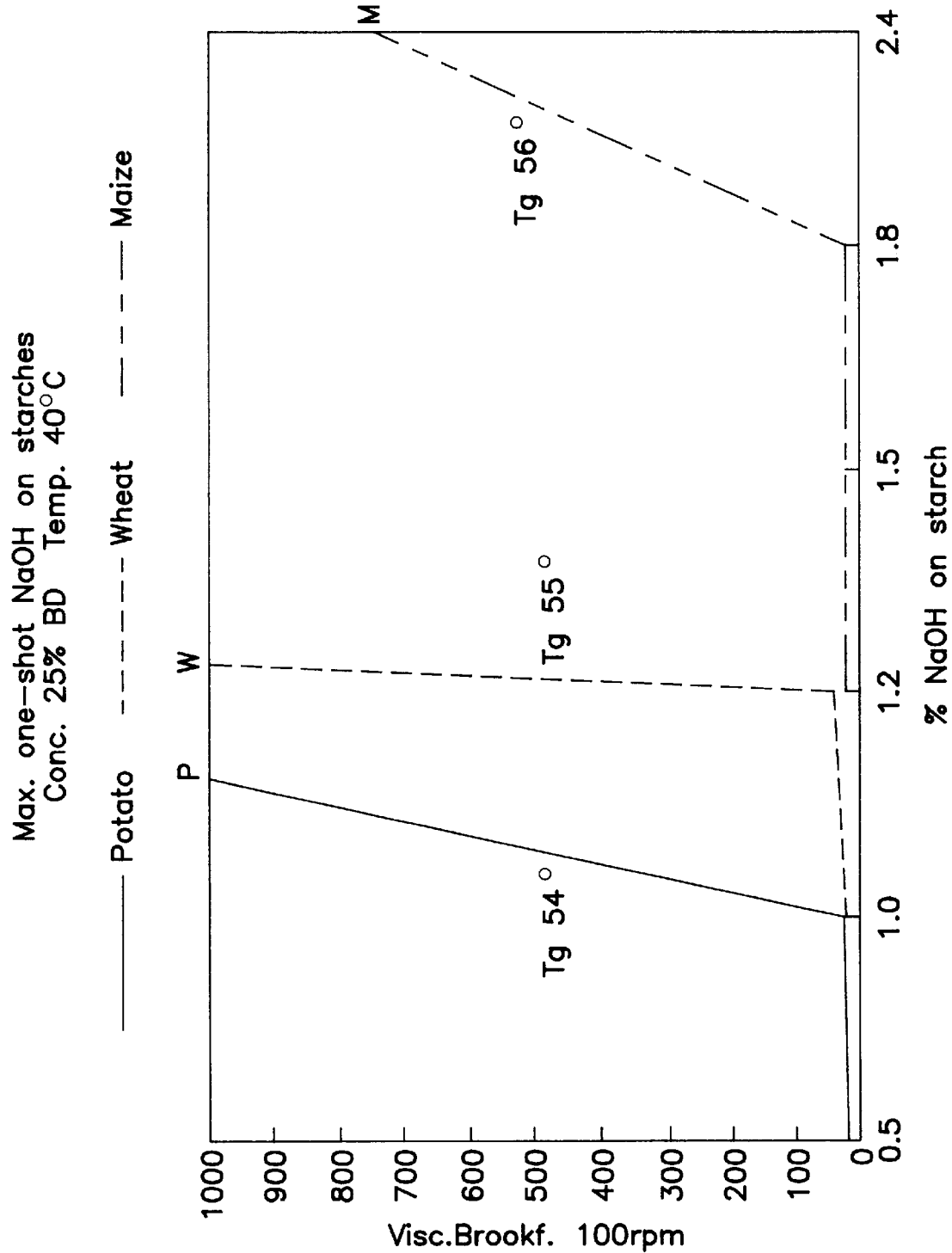

In greater detail, a system (FIG. 1) for carrying out a batch preparation of glue for corrugated board comprises a first and large mixing vessel 1, containing a stirrer 3, and comprising pipes 15, 10 for supplying starting materials, such as starch and water, respectively. A discharge pipe 12 discharges a glue product from vessel 1. The first mixing vessel 1 is coupled to a recirculation pipe 20, in which a second and comparatively smaller mixing vessel 2 is incorporated. The second and smaller mixing vessel 2 contains a stirring means 4 for exerting a shearing force which is greater than the shearing force exerted in the first mixing vessel 1. Preferably, means 4 comprises at least two chambers, each of which contains a mixing disc. These two mixing vessels 1 and 2, together with discharge pipe 12 and recirculation pipe 20, make up the recirculation system or the reactor in which the preparation of the glue takes place.

According to the invention, the second mixing vessel 2 is provided with a pipe 16 for supplying caustic soda (lye). The advantage of supplying of lye to the second mixing vessel 2 is that the means 4 exerts a shearing force which is higher than the shearing force exerted in the first mixing vessel 1; therefore, the lye comes into contact with the starting materials at a location where a vigorous mixing takes place (in the second mixing vessel), which prevents inhomogeneity.

Preferably, the second mixing vessel is connected to a source of borax via a supply pipe 17. It is preferable to supply borax to the second mixing vessel 2, in which vigorous mixing takes place, in order to prevent large viscosity fluctuations caused by poor mixing.

In operation, container 5 supplies starch to the first or large mixing vessel 1 via pipe 15. Water is supplied to mixing vessel 1 via pipe 10. Lye, in particular caustic soda, is supplied from container 6 to mixing vessel 2 via pipe 16.

The carrier is formed by starch, water and lye. Borax is supplied from supply 7 to the second or smaller mixing vessel 2, via pipe 17. If desired, the borax may also be supplied to mixing vessel 1 as well as to mixing vessel 2. The preferred form of the borax is a solution or a suspension.

Mixing vessel 1 may be heated by supplying steam thereto via pipe 11. During the preparation of the glue, the temperature is maintained at 20–40° C. The pump 13 sends the reaction mixture from mixing vessel 1 to mixing vessel 2 via recirculation pipe 12 and valve 14. The greater shearing forces exerted in vessel 2 obtain the desired viscosity more quickly. Container 8 holds a different type of starch for the secondary carrier supplied through pipe 18 into vessel 1.

As soon as the desired final product homogeneity of the glue is reached, valve 14 may be adjusted so that the desired final end product is discharged to a distribution system via pipe 9. This system may include any well known corrugator for making corrugated board.

According to the present invention, it is possible to use starches which have a high peak viscosity, such as potato starch. The amount of lye which is metered in two steps is larger than the amount of lye which is metered in a single step. Furthermore, a lower gelling point is obtained with lye being metered in with two steps, in comparison with the gel point when the lye is metered in a single step, as is usual in the prior art.

In the inventive device, it is possible to prepare the carrier from starch, water and lye after stirring for about 5 minutes. The remaining components of the glue are supplied to the carrier in order to produce a final composition, having the desired homogeneity and viscosity, within 15 minutes.

DETAILED DESCRIPTION OF THE INVENTION

In the first step, water and starch are supplied to form a carrier in the first mixing vessel and then the resulting carrier is transported to the second mixing vessel. Lye is first added in a controlled manner in the second mixing vessel to prepare the carrier. The carrier reaches a stable viscosity after a recirculation from the first to second mixing vessels has taken place. After the remaining amounts of starch and water have been added to the carrier, lye is supplied in an even manner to the second mixing vessel and thereafter that borax is added. During a period involving a means for exerting great shearing forces upon the concentration, a homogeneous composition is obtained directly in the second mixing vessel. As a result, the mixing time is reduced.

The term "stable viscosity" is used herein to mean a viscosity value that will remain stable even if the carrier is thereafter stirred or recirculated over a prolonged period of time.

According to another preferred embodiment of the invention, after supplying the remaining amounts of starch and water to the prepared carrier, an additional amount of lye is supplied to the second mixing vessel before borax is added thereto. By metering lye in two stages, it becomes possible to supply an amount of lye in the first step which is smaller than the total amount of lye that is required. The secondary starch (that is, the starch to be added in the second step) is not affected by any excess amount of lye that may be present in the carrier. Hence, there is little or no limitation imposed by a premature gelatinization.

After the water and starch have been mixed in the first step, an amount of lye sufficient to cause the desired swelling or gelling of the starch is added to the mixture of water and starch via the second mixing vessel. Then, a vigorous mixing takes place in the second mixing vessel, after which water and starch are supplied via the first mixing vessel to the mildly alkaline carrier that is being prepared. Because the carrier prepared in the first step contains only a limited amount of lye that is adapted to the amount of starch that is present at that moment, the starch supplied thereto in the second step is not affected. After the starch and water have been added in the second step, the additional amount of lye is added to the mix, followed by a metering of borax into the mix.

The amount of lye supplied to the carrier prepared in this manner leads to a lowered gelling point. In practice, it has been found that the gelling point of maize starch is lowered by about 5° C. per gram of NaOH (lye) added to one liter of a carrier (whereby this NaOH (lye) is converted into 100% solid matter). The 5° C. per gram may vary somewhat depending upon the alkaline sensitivity. Thus, in accordance with the inventive method, it is possible to lower the gelling point by about 40° C. That is, a dose of 8 g/liter of lye is used. The maximum lowering of the gelling point that can be achieved with the prior art method is about 36° C.

Research has shown that the lowering of the gelling point depends on the type of starch that is used. Thus, for example, a lowering of about 2.5° C. per gram of NaOH (lye) added to one liter of carrier is achieved with potato starch. In practice, it is desirable for the gelling point to be lowered because then a higher processing speed of the glue is possible.

More particularly, the total amount of lye supplied in the first and the second step is greater than the total amount of lye supplied in a single step. By supplying lye in two stages, the amount of lye supplied in the first stage is sufficient to control a swelling of the starch present in the carrier that is being prepared. A carrier which is mildly alkaline is obtained. As a result, the amount of starch to be supplied in the second step is not affected, after which the remaining amount of lye for lowering the gelling point is supplied, preferably in the second mixing vessel, to the slurry which has been thus prepared. In other words, the amount of lye supplied in the first step for preparing the carrier according to the present invention is less than the amount of lye supplied in the second step according to the prior art. Because the secondary starch is not affected, it is possible to use a larger amount of lye than is used in the when lye is supplied in a single step.

The invention will be further understood by a study of the following examples.

EXAMPLE 1

In this example, a glue making system shown in FIG. 1 has a capacity of 2000 liters (net capacity: 1900 liters). A cross-linked potato starch, a solution of caustic soda, and a solution of borax were used.

To prepare the carrier, 200 liters of water were supplied to the first and larger mixing vessel 1 and heated to 40° C. Next, 40 kg of potato starch were added. The water and starch were mixed and circulated for about 30 seconds, during which the stirrer in mixing vessel 2 was set to 1500 revolutions, per minute. Then, 20 kg of a 33% lye solution were supplied to the second and smaller mixing vessel 2 during a period of 3 minutes.

After stirring and circulating for 7 minutes, 1184 liters of water were supplied to the first mixing vessel. A total of 17.8 kg of borax solution (Eurobox 3× borax 10 AQ, 1.5%) was supplied simultaneously to the smaller mixing vessel 2. Finally, the remaining amount of starch (405 kg of potato starch) was supplied to the larger mixing vessel 1 during a period of 2 minutes.

The resulting composition was subsequently mixed for 1 minute, after which 2027 kg of glue was obtained in 22 minute. The contents of mixing vessel 1 were discharged to distribution system 9 for 5 minutes.

EXAMPLE 2

A carrier was prepared according to the method of Example 1, with a difference that a natural starch was used. Because natural starch was used, the amount of lye used during the preparation of the carrier was less than the amount that was used in Example 1. The carrier which was thus prepared included 400 liters of water, 80 kg of natural starch, and 20 kg of a 33%, lye solution (supplied to mixing vessel 2). After supplying 1184 kg of water and 17.8 kg of borax solution in the second step, 365 kg of natural starch were added. From this, it appears that the capacity of the inventive device was larger when natural starch was used than when a modified starch was used. The modified starch was cross-linked potato starch, as described in Example 1.

EXAMPLE 3

The carrier of Example 1 was produced, except that 12 kg of a 33% lye solution (supplied via the smaller mixing vessel 2) was used for preparing the carrier during the first step. Then, after adding the remaining amounts of water and starch to mixing vessel 1, a second amount of 10 kg of a 33% lye solution was supplied to the second mixing vessel before supplying borax thereto. The glue which was thus prepared had a gelling point of 46° C. This gelling point is lower than the gelling point of the glue prepared in Example 1, which had a gelling point of 5° C. The amount of lye supplied in Example 3 was 22 kg of a 33% lye solution, while the amount of lye supplied in Example 1 was 20 kg of a 33% lye solution. The lowering of the gelling point was ascribed to the increased amount of lye that was added in two steps. On the other hand, the amount of lye in Example 1 was added in a single step.

COMPARATIVE EXAMPLE

In this comparative example, the starch was a modified maize starch (mylbond BKF) used with a solution of caustic soda and borax as the solid substance. This comparative example corresponds to Example 1 of European Patent Application 0 391 477.

In order to prepare the carrier, 430 liters of water, 43 kg of starch, and 11 liters of a 30% NaOH-solution were supplied to the larger mixing vessel 1. The stirrer 3 in mixing vessel 1 was set to 1500 revolutions per minute. The temperature in the mixing vessel 2 was maintained at about 20° C. The stirrer 4 was set to 1500 revolutions per minute while pump 13 circulated the contents of mixing vessel 1.

For the second step, 680 liters of water, 257 kg of starch, and 2.5 kg of borax were supplied to form the carrier, which was prepared in the first mixing vessel. The stirring and recirculating were continued. The carrier under preparation had to be stirred for at least 15 minutes in order to obtain a homogeneous mixture. In addition, it was only possible to prepare a homogeneous carrier by vigorously stirring in mixing vessel 2. The viscosity of the carrier appeared to change, even after 10 minutes.

It should be apparent that, when all starting materials are added to the first mixing vessel in order to prepare the glue, a longer mixing time is required to obtain a homogenous solution as compared to the mixing time with the inventive embodiment where lye was added to the second mixing vessel, as described in Example 1. In addition, it has become apparent that the adhesive power of the glue prepared in accordance with the comparative example is lower than the adhesive power of the glue prepared in accordance with Examples 1–3.

COMPARISON OF ONE-SHOT/TWO-SHOT SYSTEM:

During preparation, dosing the NaOH (lye) into the glue in two portions can obtain a lower gel point as compared to the conventional way by dosing all of the required NaOH at one time, especially for glue used in the double-backer corrugating machine. With two doses the native powder in the glue does not swell. A minimal quantity of a NaOH is necessary to enable a complete gelatinization of the carrier starch. The rest of the NaOH takes care of the desired gel point and can be dosed as a last component to be added to the glue.

Another important fact is the concentration and the temperature of the glue. When the concentration and temperature are higher, the secondary starch swell faster.

During research, the maximum quantity of NaOH (lye) that can be dosed under certain conditions was studied and the differences between potato starch, wheat starch, and corn starch during this process were noted. At least, theoretically, the lowest gel point with the lowest NaOH quantity can only be achieved with potato starch. Also, theoretically, it is to be expected that with a concentration of 0.6% NaOH on water, the starch will start swelling. A concentration of 1% NaOH on starch will lower the gel point with about 6.5° C.

For the investigation, a 25% alkaline slurry (on dry material) of native corn, wheat, and potato starch was chosen. No complete glue was made with just a carrier and borax. The reaction temperature was 30° and 40° C.

The research also included "one shot" tests carried out in the manner of the prior art and "two-shot" tests carried out in the manner of the invention.

A. POTATO STARCH

| A. POTATO STARCH ONE-SHOT (Prior Art) | | | | | |
|---|---|---|---|---|---|
| NaOH on starch | 1.0% | 1.2% | 1.5% | 1.8% | |
| NaOH on water | 0.33% | 0.4% | 0.5% | 0.6% | |
| Analyses at 30° C. | | | | | |
| pH | 12.15 | 12.3 | 12.5 | | |
| Brookf.20/100 | 0/20 | 20/60 | 1160/1120 | | |
| Gelpoint | 52° | 49.5° | 47° | | |
| Analyses at 40° C. | | | | | |
| pH | 11.9 | 12.1 | 12.3 | | |
| Brookf.20/100 | 0/28 | 125/170 | 3000/2800 | | |
| Gelpoint | 54° | 52° | 49.5° | | |
| TWO-SHOT (Invention) | | | | | |
| First shot | 1.0% | 1.0% | 1.0% | 1.0% | 1.0% |
| Second shot | 0.2% | 0.5% | 0.8% | 1.1% | 1.4% |
| NaOH on starch | 1.2% | 1.5% | 1.8% | 2.1% | 2.4% |
| NaOH on water | 0.4% | 0.5% | 0.6% | 0.7% | 0.8% |
| Analyses at 30° C. | | | | | |
| pH | 12.35 | 12.4 | 12.5 | 12.7 | |
| Brookf.20/100 | 0/20 | 0/27 | 5/40 | 80/110 | |
| Gelpoint | 49.5° | 47° | 4.5° | 42° | |
| Analyses at 40° C. | | | | | |
| pH | 12.15 | 12.25 | 12.35 | | |
| Brookf.20/100 | 0/30 | 240/220 | 950/730 | | |
| Gelpoint | 52° | 49.5° | 47° | | |
| B. WHEAT STARCH ONE-SHOT (Prior Art) | | | | | |
| NaOH on starch | 1.0% | 1.2% | 1.5% | 1.8% | |
| NaOH on water | 0.33% | 0.4% | 0.5% | 0.6% | |
| Analyses at 30° C. | | | | | |
| pH | 12.15 | 12.25 | 12.4 | | |
| Brookf.20/100 | 0/30 | 30/60 | 20000/8000 | | |
| Gelpoint | 55.5° | 53° | 50.5° | | |
| Analyses at 40° C. | | | | | |
| pH | 11.9 | 12.1 | 12.35 | | |
| Brookf.20/100 | 0/25 | 15/40 | 28000/10000 | | |
| Gelpoint | 58° | 55.5° | 53° | | |
| TWO-SHOT (Invention) | | | | | |
| First shot | 1.0% | 1.0% | 1.0% | 1.0% | |
| Second shot | 0.2% | 0.5% | 0.8% | 1.1% | |
| NaOH on starch | 1.2% | 1.5% | 1.8% | 2.1% | |
| NaOH on water | 0.4% | 0.5% | 0.6% | 0.7% | |
| Analyses at 30° C. | | | | | |
| pH | 12.1 | 12.3 | 12.45 | 12.7 | |
| Brookf.20/100 | 0/20 | 7/35 | 35/60 | 100/140 | |
| Gelpoint | 55.5° | 53° | 50.5° | 43° | |
| Analyses at 40° C. | | | | | |
| pH | 12.1 | 12.25 | 12.4 | | |
| Brookf.20/100 | 11/40 | 100/140 | 800/600 | | |
| Gelpoint | 55° | 53° | 50.5° | | |
| C. MAIZE (CORN) STARCH ONE-SHOT | | | | | |

-continued (Prior Art)

| | | | | |
|---|---|---|---|---|
| NaOH on starch | 1.2% | 1.8% | 2.4% | 3.0% |
| NaOH on water | 0.4% | 0.6% | 0.8% | 1.0% |
| Analyses at 30° C. | | | | |
| pH | 12.3 | 12.45 | 12.75 | 12.95 |
| Brookf.20/100 | 0/20 | 0/20 | 25/75 | 2400/2400 |
| Gelpoint | 63° | 60° | 56.5° | 53° |
| Analyses at 40° C. | | | | |
| pH | 12.3 | 12.5 | 12.7 | |
| Brookf.20/100 | 0/20 | 0/20 | 660/800 | |
| Gelpoint | 63° | 60° | 56.5° | |
| TWO-SHOT | | | | |
| (Invention) | | | | |
| First shot | 1.8% | 1.8% | 1.8% | |
| Second shot | 0.6% | 1.2% | 1.5% | |
| NaOH on starch | 2.4% | 3.0% | 3.3% | |
| NaOH on water | 0.8% | 1.0% | 1.1% | |
| Analyses at 30° C. | | | | |
| pH | 12.75 | 12.95 | 13.0 | |
| Brookf.20/100 | 0/30 | 0/40 | 30/72 | |
| Gelpoint | 56.5° | 53° | 50° | |
| Analyses at 40° C. | | | | |
| pH | 12.7 | 12.9 | | |
| Brookf.20/100 | 18/62 | 2800/4200 | | |
| Gelpoint | 56.5° | 53° | | |

OBSERVATIONS

The gel point measurements were hampered because of the extremely high concentration and the absence of carrier and borax. This is why the swelling is very abrupt. Further, it was more difficult to have the second shot NaOH (lye) well spread than it would have been if it was done with a commercial mixing device, as distinguished from a laboratory appliance. This was especially true with the wheat starch test.

The Brookfield viscosity gives a clear image of the degree and speed of the swelling. With the two-shot system, the swelling is much slower than with the normal one-shot system, where wheat shows the fastest progression.

Achievable minimum gel points in 25% concentration:

| | Potato | Wheat | Corn |
|---|---|---|---|
| One-shot 30° C. | 50° C. | 53° C. | 55° C. |
| Two-Shot 30° C. | 45° C. | 50° C. | 53° C. |
| One-shot 40° C. | 54° C. | 55° C. | 59° C. |
| Two-shot 40° C. | 51° C. | 53° C. | 56° C. |

The data of the measurement test results are shown in Table A.

TABLE A

| Product name | 1 Potato starch | 2 Corn starch | 3 Wheat starch |
|---|---|---|---|
| pH Value before measurement | 7.40 | 5.68 | 6.35 |
| pH value after measurement | 6 | 6.45 | 6.7 |
| Starting viscosity | 21 | 20 | 24 |
| Gel temperature | 64.8 | 84.7 | 71.4 |
| Peak viscosity | 1374 | 360 | 35 |
| peak temperature | 88.5 | 89.5 | 71.4 |
| Viscosity 90° C. | 1348 | 172 | 396 |
| Viscosity 90° C, 20 min. | 931 | 362 | 600 |
| Viscosity 75° C. | 962 | 331 | 588 |
| Viscosity 60° C. | 1074 | 345 | 700 |
| Viscosity 45° C. | 1264 | 394 | 945 |
| Viscosity 30° C. | 1489 | 461 | 1409 |
| Viscosity 20° C. | 1511 | 477 | 1594 |
| Viscosity 20° C., 20 min. | 1385 | 503 | 2543 |
| Measure head | 250 | 250 | 250 |
| Concentration | 2 | 5 | 8 |

The advantages of the invention should now be clear. Caustic soda (lye) is added in two parts so that the total amount of caustic soda (lye) can be higher than it would be when it is dosed in only the carrier. The way of doing this is by injecting the caustic directly into the second mixing vessel. Otherwise, the starch will gel in an uncontrolled manner if too much lye is added in the first mixing vessel.

If the total amount of caustic soda (lye) is dosed in only the carrier, the concentration of the caustic soda in the resulting slurry is still to high even after the secondary water has been dosed. What happens then is that part of the secondary starch will swell as soon as it enters the slurry.

With the inventive two shot method, only a small amount of caustic is dosed in order to swell the carrier starch. After the carrier is mixed and the viscosity is brought down to a stable value, secondary water and starch is added. The slurry now has a much bigger quantity of caustic so that the additional amount of caustic can be higher. However, this bigger quantity of caustic must be added in the second mixing vessel in a controlled manner.

By having more caustic in the glue, the gel temperature is lower which give the opportunity to produce corrugated board at a higher speed because less heat is needed.

Those who are skilled in the art will readily perceive how to modify the invention. Therefore, the appended claims are to be construed to cover all equivalent structures which fall within the true scope and spirit of the invention.

The claimed invention is:

1. A method of preparing batches of a glue for making corrugated board, said method comprises:

providing a first mixing vessel with a first stirrer therein operated to create a first level of shearing;

providing a second mixing vessel connected to said first vessel via recirculation means, said second mixing vessel having a second stirrer therein operated to create a second shearing which is at a level which is greater than said first level of shearing that occurs in said first mixing vessel;

preparing a carrier by a first step of starting with a combination of a first amount of water, starch and lye, using a sequence wherein said water and starch are supplied to the first mixing vessel and then carried to the second mixing vessel via the recirculation means during the first step;

a second step of adding a second amount of starch, water and borax to the carrier and mixing the aggregate into a homogeneous mixture; and adding lye to the second mixing vessel during said second step, after which a slurry formed by the preceding steps is recirculated between the first and second mixing vessels.

2. A method according to claim 1, wherein borax is supplied to said second mixing vessel.

3. A method according to claim 1, wherein the amount of starch used in said first step is less than the amount of starch added in said second step.

4. A method according to one of the claims 1–3 wherein the total amount of said lye supplied in said first and second steps is greater than the total amount of said lye that can be supplied when all lye is supplied in a single step to said first vessel.

5. The method of claim 4 wherein said first vessel is substantially larger than said second vessel.

6. The process of claim 1 wherein said starch is selected from a group consisting of maize, wheat, potato, or tapioca.

* * * * *